United States Patent [19]

Corder

[11] 4,107,046
[45] Aug. 15, 1978

[54] WATER PURIFIER

[75] Inventor: Thomas E. Corder, Fort Collins, Colo.

[73] Assignee: Teledyne Industries, Inc., Ft. Collins, Colo.

[21] Appl. No.: 784,420

[22] Filed: Apr. 4, 1977

Related U.S. Application Data

[63] Continuation of Ser. No. 617,449, Sep. 10, 1975, abandoned.

[51] Int. Cl.$^2$ .................. B01D 27/02; B01D 27/08
[52] U.S. Cl. .................................. 210/282; 210/289;
210/422; 210/433; 210/449; 210/460; 210/428
[58] Field of Search .................. 137/544, 599.1;
210/282, 287, 289, 293, 420, 422, 423, 428, 429,
433, 439, 449, 460, 463; 239/444, 553, 575, 590

[56] References Cited

U.S. PATENT DOCUMENTS

| | | | |
|---|---|---|---|
| 640,721 | 1/1900 | Vogler | 210/420 |
| 1,149,926 | 8/1915 | Linke | 210/420 X |
| 1,749,730 | 3/1930 | Kenney | 210/423 |
| 2,334,791 | 11/1943 | Roffy | 210/433 X |
| 2,521,094 | 9/1950 | Rein | 210/460 |
| 2,529,398 | 11/1950 | Krieck | 210/282 |
| 3,204,770 | 9/1965 | Brink | 210/287 X |
| 3,327,859 | 6/1967 | Pall | 210/282 X |
| 3,342,335 | 9/1967 | Gamundi et al. | 210/282 X |
| 3,595,399 | 7/1971 | Abas et al. | 210/282 X |
| 3,746,174 | 7/1973 | Watanabe | 210/282 |
| 3,747,767 | 7/1973 | Hankammer | 210/282 |
| 3,789,991 | 2/1974 | Krongos | 210/449 |
| 3,799,352 | 3/1974 | McClive | 210/282 |
| 3,811,618 | 5/1974 | Gartner et al. | 239/444 X |
| 3,822,018 | 7/1974 | Krongos | 210/449 X |

FOREIGN PATENT DOCUMENTS

| | | | |
|---|---|---|---|
| 2,177,450 | 9/1973 | France | 210/282 |
| 1,253,184 | 5/1968 | Fed. Rep. of Germany | 210/282 |
| 1,536,852 | 4/1972 | Fed. Rep. of Germany | 210/130 |
| 2,233,002 | 10/1973 | Fed. Rep. of Germany | 210/282 |
| 2,353,743 | 10/1973 | Fed. Rep. of Germany | 210/449 |
| 2,357,585 | 6/1974 | Fed. Rep. of Germany | 210/282 |
| 985,818 | 3/1965 | United Kingdom | 210/423 |
| 707,718 | 4/1954 | United Kingdom | 210/282 |
| 751,892 | 7/1956 | United Kingdom | 210/282 |
| 1,142,766 | 2/1969 | United Kingdom | 210/130 |
| 1,312,993 | 4/1973 | United Kingdom | 210/340 |
| 1,346,114 | 2/1974 | United Kingdom | 210/282 |
| 1,393,181 | 5/1975 | United Kingdom | 210/130 |

Primary Examiner—Charles N. Hart
Assistant Examiner—Robert H. Spitzer
Attorney, Agent, or Firm—Hugh H. Drake

[57] ABSTRACT

A filter cartridge, for an internally by-passable water purifier apparatus, is in the form of a tubular shell that has inlet and outlet walls with at least one opening being defined in each. A water filtering material is disposed within the shell. Running lengthwise of the shell is an arrangement for guiding water from the inlet to the outlet regions and exclusive of the filtering material. That arrangement is either interiorly of or external to the shell.

The cartridge is usable in a purifier apparatus that has a housing with an inlet for the flow of water as well as a single outlet area for discharging the flow of water. A channel defines the path of water flow from the inlet to the outlet, and a chamber is defined in that channel in the path of the flow. One valve is disposed in the channel for controlling the flow of water from the inlet through the cartridge to the outlet. In addition, another valve is disposed in the channel for controlling the flow of water from the inlet to the outlet along a path that by-passes the cartridge.

37 Claims, 22 Drawing Figures

Fig_1

Fig_2

Fig_3

Fig_4

Fig_5

Fig_6

Fig_7

Fig_8

Fig_9

Fig_10

Fig_11

Fig_12

Fig_13

Fig_14

Fig_15

Fig_16

Fig_17

Fig_18

Fig_20

Fig_21

Fig_22

WATER PURIFIER

This is a continuation of co-pending parent application Ser. No. 617,449 filed Sept. 10, 1975, now abandoned, and assigned to the same assignee as the present application.

The present invention pertains to an internally by-passable water purifier apparatus as well as to a filter cartridge therefor. More particularly, it relates to both a filter cartridge and an apparatus that permits the selective distribution from a common source of either purified or non-purified water.

Surveys have indicated that a significant percentage of water obtained from individual taps in the home and the like contains one or more bacterialogical or chemical constituents that exceeds limits set forth in standards issued by public health services. In some cases, such samples evidence a potential danger. Various studies have identified a need for improved systems to control at least aesthetically undesirable concentrations of various minerals and other constituents as well as color, taste and odor. The problem is one of both preventing the transmission of disease or the like as well as in overcoming effects that may be adverse to the sensibilities of the user.

One answer has been a steadily increasing usage of bottled water. At the same time, there have been a number of entries into the marketplace of point-of-use purification devices. The latter have included in-line filters, under-the-sink filters, free-standing drink-size separate filter units and filter devices that attach to the conventional sink faucet or to the typical aerator secured thereto.

In general, a somewhat limited number of processes have been found to be capable of removing undesired materials from water. These include reverse osmosis, freezing, filtration, chemical oxidation, distillation, adsorption on powdered charcoal and adsorption on granular activated carbon. Carbon filtration has been found to be particularly effective in removing some detergents, insecticides, viruses, specific chemical pollutants and taste and odor pollutants. For example, carbon has long been used for the removal of chlorine from water in the brewing and soft drink manufacturing industries. Activated carbon removes tastes and odors from water by an adsorption process in which substances of one kind are accumulated on the surfaces of another. The activated carbon has extremely large surface areas that make it efficient. The activation process produces pores that contribute substantially to increased surface area of treatment. In some cases, the activated carbon has been treated with oligodynamic silver which acts as a bactericide and self-sanitizing agent.

One obviously desirable location for a water purifier is in the vicinity of the kitchen sink in a conventional home. The usual kitchen sink will have one or two faucets for dispensing hot and cold tap water. In addition, many sinks now include a so-called vegetable spray attached to a hose for usage as its name implies. The addition of a water purifying apparatus has frequently meant the undesired occupation of counter space, under-sink space or interference to convenient utilization because of the need for flexible hoses. In fact, an objective by some manufacturers, to achieve comparatively low cost in such apparatus, has led to the production of units which attain that end only at the expense of interference with space utilization or aesthetic unattractiveness.

It is, accordingly, a general object of the present invention to provide new and improved water-purifying apparatus which overcomes at least many of the aforenoted disadvantages or otherwise undesirable features.

Another object of the present invention is to provide new and improved water-purifier apparatus which may be permanently installed but yet which needs not require the services of a plumbing tradesman for installation.

A specific object of the present invention is to provide a new and improved water purifier which enables a direct and exceedingly simple selection as between the usage of purified or unpurified tap water.

A further object of the present invention is to provide a new and improved water purifier which is aesthetically pleasing when installed in the home or even in a commercial or manufacturing area.

Still another object of the present invention is to provide a new and improved water purifier and replaceable filter cartridge therefor that may be manufactured from readily-available materials.

Related to all of the foregoing objects, it is an aim to provide a new and improved water purifier as well as a replaceable cartridge therefor that is significantly effective while yet being economical of production and reproduction.

A different object of the present invention is to provide a new and improved water purifier apparatus as well as a replaceable cartridge therefor that is easily and readily replaced.

A significant object of the present invention is to provide a new and improved water purifier and replaceable cartridge therefor that is readily installed in a large number of existing water facilities while at the same time being capable of comparatively easy installation in other facilities.

A detailed object of the present invention is to provide a new and improved water-filter cartridge that is readily replaceable, economical, may be discarded when expended and which through its own mechanical structure both simplifies and augments the operation of its associated water purifying apparatus.

A filter cartridge in accordance with the present invention is meant to be used in an internally by-passable water purifier apparatus. It includes a tubular shell, an inlet wall that closes one end of the shell and has means therein defining at least one opening, and an outlet wall closing the other end of the shell which also has means therein defining at least one opening. A water filtering material is disposed within the shell between the inlet and outlet walls in a position between the openings. Finally, the cartridge includes directing means that run lengthwise of the shell for guiding water from the vicinity of the inlet wall to the vicinity of the outlet wall and exclusive of the filtering material and the openings.

Further in accordance with the invention, an internally by-passable water purifier itself includes a housing together with inlet means in the housing for admitting a flow of water and outlet means in the housing for discharging a flow of water from a common portion of the housing. Channel means in the housing define a path for the flow of water from the inlet means to the outlet means. Defined in the channel means is a chamber that receives a water-purifying cartridge in the path of the water flow. Means including a first valve disposed in the channel means controls the flow of water from the inlet means through the cartridge to the outlet means. Means, including a second valve disposed in the channel means for controlling the flow of water from the inlet means to the outlet means, is effective to by-pass the water around the cartridge.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
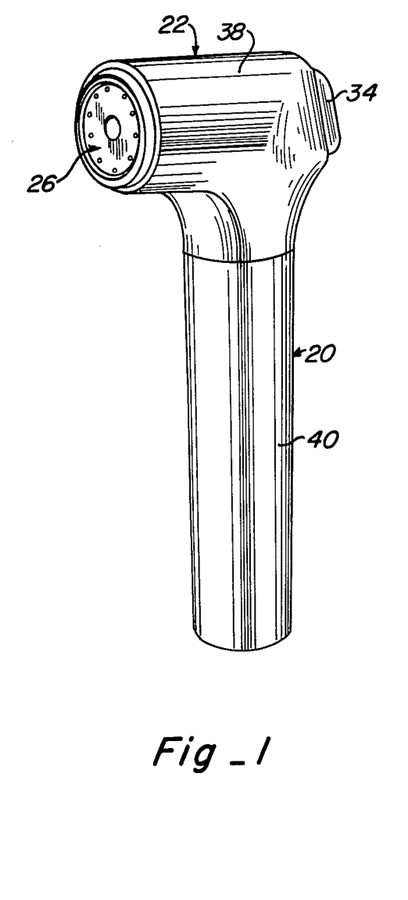
FIG. 1 is a perspective view of a first embodiment of water purifier apparatus.
Figure 2:
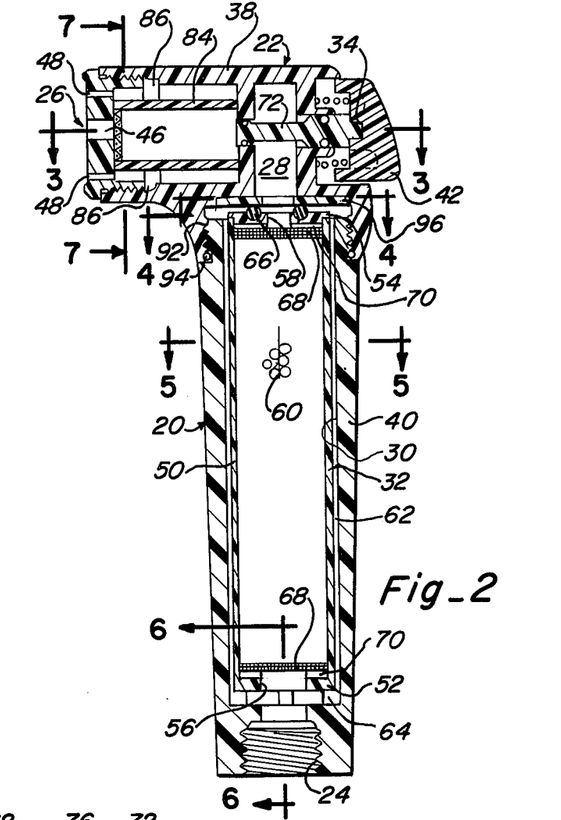
FIG. 2 is an enlarged vertical cross-sectional view of the apparatus of FIG. 1.
Figure 3:
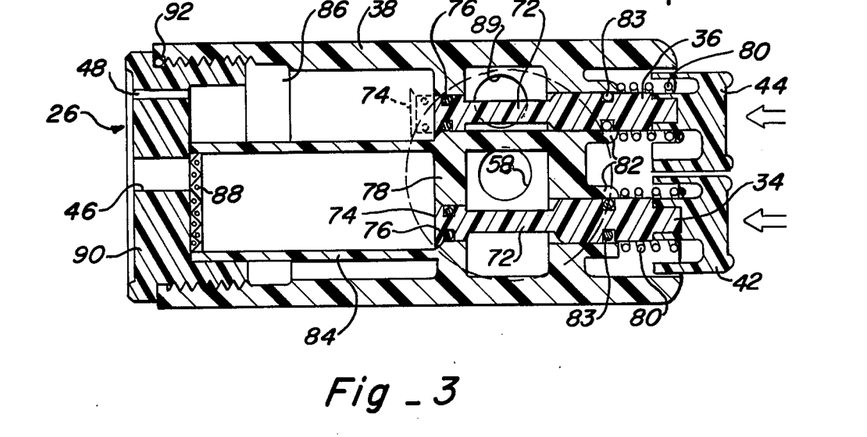
FIG. 3 is an enlarged cross-sectional view taken along the line 3—3 in FIG. 2.
Figure 4:
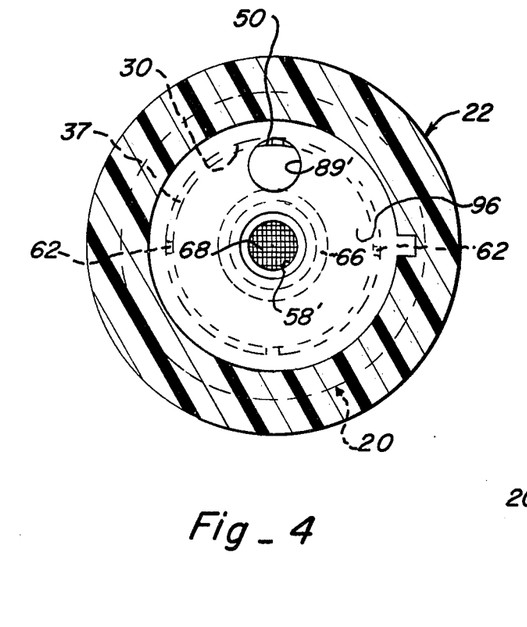
FIG. 4 is an enlarged cross-sectional view taken along the line 4—4 in FIG. 2.

A first embodiment of an internally by-passable water purifier 20 includes a housing 22 which has an inlet 24 for admitting a flow of water and an outlet arrangement 26 for discharging a flow of water. Extending all of the way from inlet 24 to outlet 26 is a continuous channel 28 that defines a path for the flow of water from the inlet to the outlet. Channel 28 includes a chamber 30 that is shaped to receive a water-purifying cartridge 32 that is disposed in the path of water flow. A first valve 34 is disposed in channel 28 to control the flow of water from inlet 24 through cartridge 32 to outlet 26. A second valve 36 is disposed also within channel 28 for controlling the flow of water from inlet 24 to outlet 26 in by-pass of cartridge 32. It will be observed that chamber 30 is located upstream from valves 34 and 36. Moreover, chamber 30 and cartridge 32 together define a passage 37 (see FIG. 5) for the flow of water around cartridge 32 so as to be under the control of valve 36.

As specifically shown, housing 22 includes a first portion 38 that contains outlet 26 and valves 34 and 36. Housing 22 also includes a second portion 40 that is threaded into first portion 38 so as to secure the two portions together as well as to seat cartridge 32 securely within chamber 30. Portion 40 downwardly depends from one end of portion 38 so as to serve as a handle which is dimensioned to be gripped by the human hand. Inlet 24 is internally threaded so as to form a coupling that desirably conforms to those which are now standard for connection to the conventional vegetable-spray hose associated with many ordinary kitchen sinks.

Each of valves 34 and 36 includes a respective valve operator 42 and 44 that projects from the end of portion 38 above the upper end of portion 40 and opposite outlet arrangement 26. The outlet arrangement includes a first opening 46 that is in communication with valve 34. At least one additional opening 48 is in communication with valve 36. Preferably, however, there are a plurality of openings 48 spaced individually apart to collectively encircle opening 46, so as to permit usage of water delivered from openings 48 in the manner of the ordinary vegetable spray associated with the typical kitchen sink.

Figure 5:
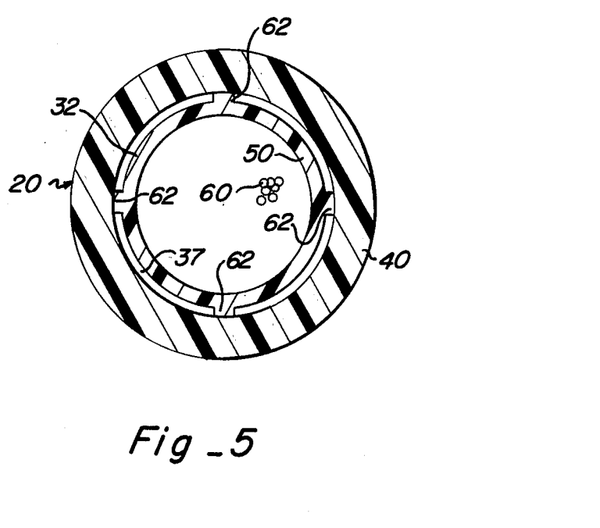
FIG. 5 is an enlarged cross-sectional view taken along the line 5—5 in FIG. 2.
Figure 6:
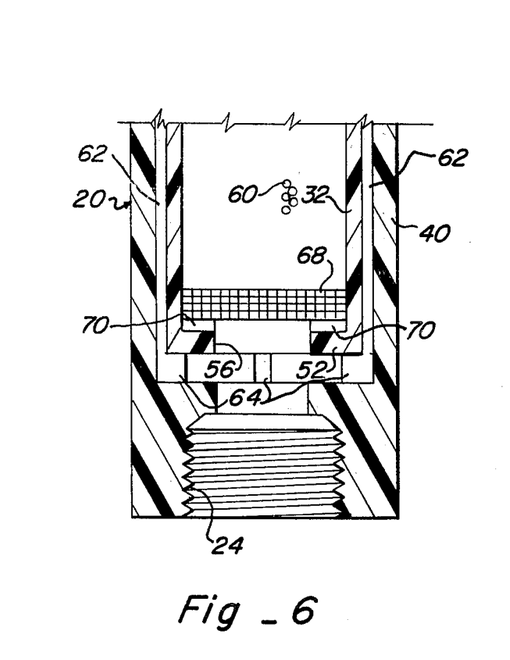
FIG. 6 is an enlarged cross-sectional view taken along the line 6—6 in FIG. 2.
Figure 7:
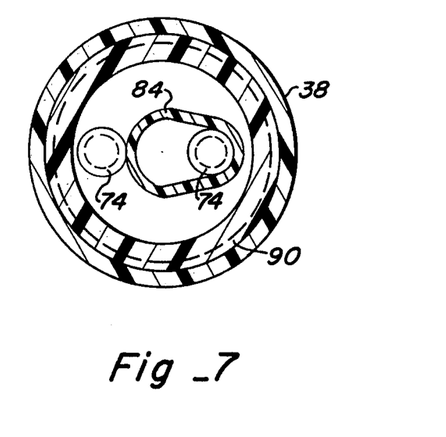
FIG. 7 is an enlarged cross-sectional view taken along the line 7—7 in FIG. 2.
Figure 8:
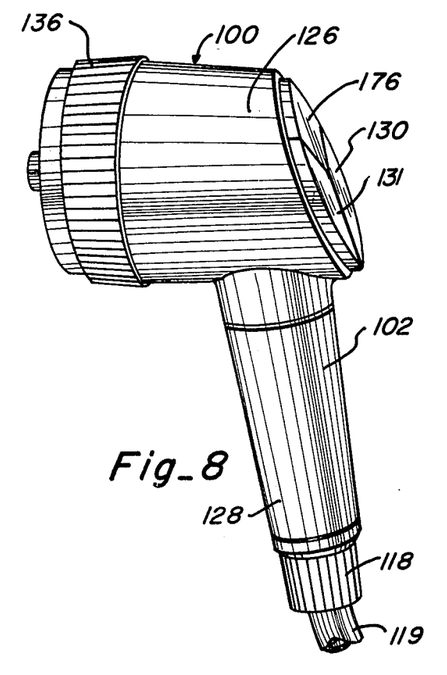
FIG. 8 is a perspective view of a second embodiment of water purifier apparatus.
Figure 9:
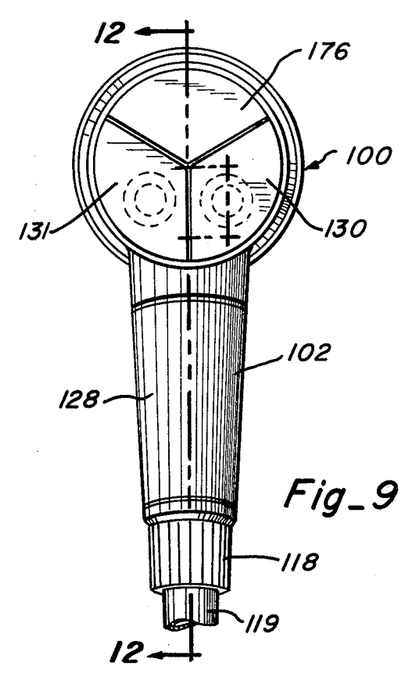
FIG. 9 is a rear elevational view of the apparatus of FIG. 8.
Figure 10:
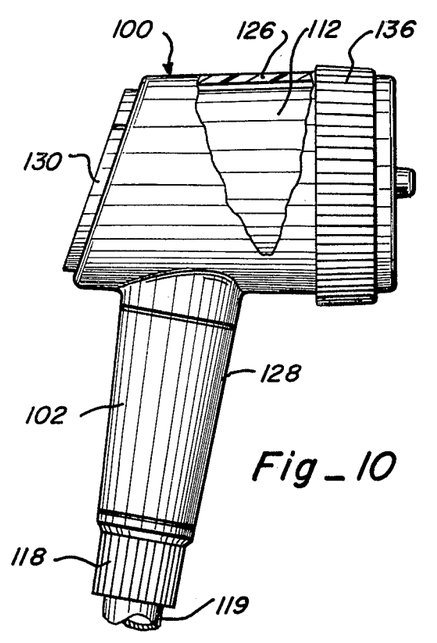
FIG. 10 is a side elevational view of the apparatus of FIG. 8.
Figure 11:
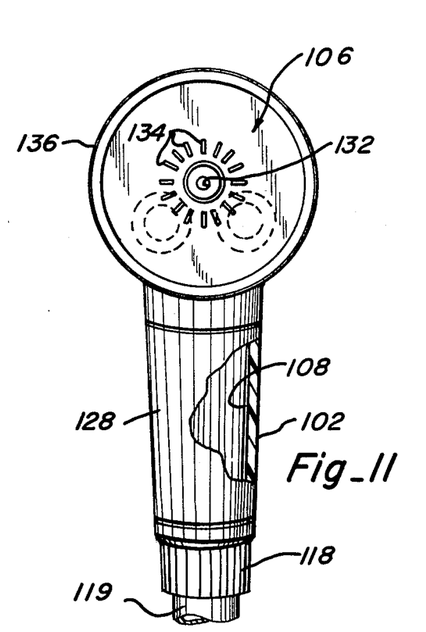
FIG. 11 is a front elevational view of the apparatus of FIG. 8.

Directing attention more specifically to cartridge 32, it includes a tubular shell 50 closed at one end by an inlet wall 52 and at the other end by an outlet 54. An opening 56 is formed in inlet wall 52, while an opening 58 is formed in outlet wall 54. A water filtering material 60 is disposed within shell 50 between inlet and outlet walls 52 and 54 and in a position between openings 56 and 58. In correspondence with filters as described in the introduction hereto, filter material 60 is primarily of granulated activated carbon. Preferably, the carbon is mixed with silver zeolite so as to inhibit bacterial growth within the filter. Ribs 62, projecting outwardly from the external surface of shell 50, run lengthwise of the shell for guiding water from the vicinity of inlet wall 52 to the vicinity of outlet wall 54, so as to define a water flow path which is exclusive of filter material 60. Ribs 62 are laterally-spaced from one another so as to define a plurality of mutually-adjacent water-flow channels. At least one pair of such ribs 62 are required. Preferably, however, a larger plurality of the ribs are spaced around the circumference so as to provide support for shell 50 within the receiving structure defined by chamber 30 and, therefore, also so as to define a plurality of the water flow channels.

The rib structures also are extended into the inlet end. That is, they define a plurality of outwardly-projecting ribs 64, aligned with ribs 62, that accommodate the flow of water around inlet wall 52 into the longitudinal passages 37 defined by ribs 62.

At the upper end of cartridge 32 is a tubular seal 66 of resilient material, such as rubber, that encircles and projects outwardly from around opening 58. Filter material 60 is sandwiched between a pair of layers 68 of fibrous sheet, such as ordinary felt, individually disposed adjacent to respective different ones of end walls 52 and 54. Layers 68 to serve to hold the carbon granules in place as well as, at the upstream end, to remove ferrous oxides that tend to become jelly-like and, therefore, would tend to clog the carbon granules. At the downstream end, layer 68 removes so-called carbon "fines" which are a powder-like derivative from the main granular filter. Also desirably included are ribs 70 that project inwardly from each of inlet and outlet walls 52 and 54 in a position to hold layers 68 spaced from the respective ones of the end walls and thereby permit distribution of the flowing water through the entirety of the filter material.

Turning to what may seem to be mere details, but yet which represent valuable features of the whole apparatus, valves 34 and 36 each include a valve stem 72 upon the inner end of which is a valve head 74 which captivates an O-ring 76 that, upon closing of the valve, presses into an opening in an internal wall 78 of housing portion 38 and in which such opening therein defines the valving flow path. Valve operators 42 and 44 are secured on the other end portions of valve stems 72, with a compression spring 80 encircling the valve stem between the valve operators and another internal wall 82 formed as part of housing portion 28. An O-ring 83 secures the other end portion of each valve operator within a receiving boss formed in wall 82. Valve 34 permits water from within the associated portion of channel 28 defined by opening 58 to be delivered through a sleeve 84, secured by studs 86 centrally within the bore of portion 38, and preferably through a mesh screen 88, for delivery from central outlet 46. Depression of valve operator 42 on valve 34 thus permits the delivery through the device and from outlet 46 of water purified by passage through cartridge 32.

On the other hand, depression of valve operator 44 on valve 36 permits the delivery through apertures 48 of water that flows alongside the exterior of cartridge 32, through an opening 89 in the bottom of portion 38 and along the exterior of sleeve 84. Thus, the water is emitted from apertures 48 as a spray of ordinary tap water. This extends the life of cartridge 32 by obviating its use when it is unnecessary for the purpose at hand to employ the purification capabilities of the unit.

Other detailed ramifications of the unit include the formation of outlets 46 and 48 in a cap 90 that is threadably secured into the discharge end of housing portion 38 and sealingly affixed thereto by means of an O-ring 92. Downwardly-depending housing portion 40 is threadably secured into the other housing portion 38 by means of threaded section 92. An O-ring 94 insures sealing integrity. In addition, a collar 96 preferably is sonically-welded at the entrance to the portions of channel 28 defined in housing portion 38. Collar 96 cooperates with outlet wall 54 of cartridge 32, along with seal 66, so as to insure the formation of a water-tight seal between the outlet end of cartridge 32 and the entrances into housing portion 38. When greater sealing effect is desired, collar 96 may be formed to include a downwardly-depending boss that carries an external O-ring dimensioned to fit sealingly into opening 58. Still further, seal 66 may project from the outer perimeter of opening 58 so as to fit upwardly into the opening in collar 96.

The overall shape of the device in FIGS. 1-7 is particularly attractive in that it closely resembles that of the conventional vegetable spray device ordinarily found in connection with many kitchen sinks. Yet, of course, it represents a significant improvement in that it also provides for selection of a stream of purified water. The conformation of the components is such as to enable a user very readily to replace cartridge 32 simply by unscrewing housing portion from 38, removing the expanded cartridge and substituting a new one.

Nevertheless, the embodiment of FIGS. 8-19 is presently preferred because it is not only enables economy of construction but also provides for a filter cartridge conformation that has increased cost effectiveness. Water purifier 100 includes a housing 102 that has an inlet 104 for admitting the flow of water and an outlet arrangement 106 for discharging a flow of water. A channel 108 is defined through the housing so as to establish a path for the flow of water from inlet 104 to outlet arrangement 106. A chamber 110 is defined as part of channel 108 so as to receive a water-purifying cartridge 112 disposed in the path of water flow. A first valve 114 is disposed in channel 108 so as to control the flow of water from inlet 104 to outlet 106 through cartridge 112. A second valve 116 is also disposed in channel 108 so as to control the flow of water from inlet 104 to outlet 106 but in a manner that is effective to by-pass cartridge 112.

Inlet 104 is formed to include a truncated seal seat 117 which extends to an internally-threaded bore that receives a coupling 118. A hose 119 is crimped by a band 120 into a preferably nylon tube 121. A resilient C-washer 122 holds tube 121 so that band 120 is disposed within the bore of coupling 118. On the upper end of the tube 121 are a spacer washer 123 and a resilient washer 124 held in place by a flange formed on the end of the tube. This entire coupling arrangement forms a swivel seal as conventionally used with a water hose of the type typically associated with the aforementioned vegetable spray. A similar approach is contemplated with respect to the embodiment of FIGS. 1-7.

Figures 12, 13:
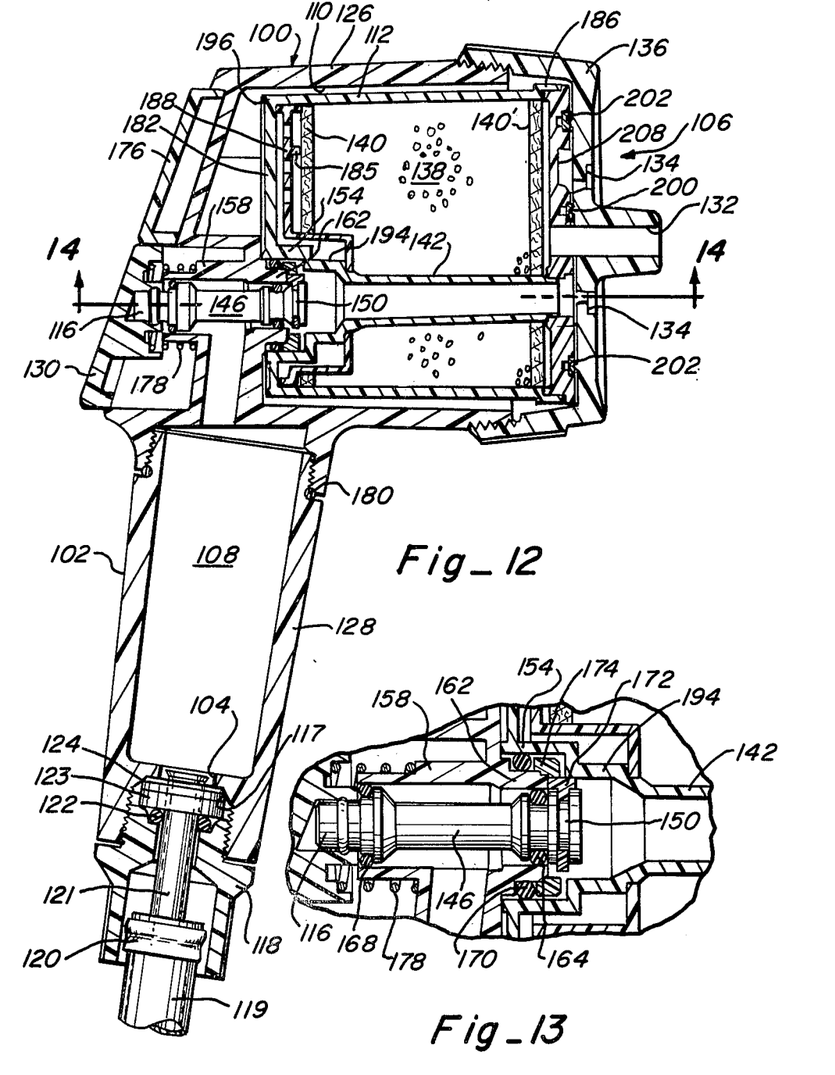
FIG. 12 is an enlarged cross-sectional view taken along the lines 12—12 in FIG. 9.
FIG. 13 is an enlarged fragmentary cross-sectional view of a portion of FIG. 12.
Figure 14:
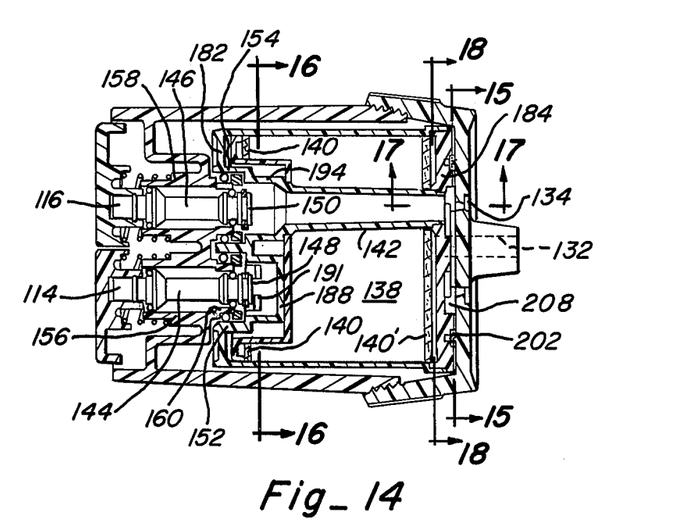
FIG. 14 is a cross-sectional view taken along the line 14—14 in FIG. 12.
Figure 15:
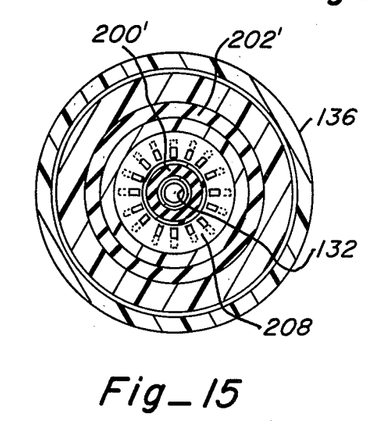
FIG. 15 is a cross-sectional view taken along the line 15—15 in FIG. 14.
Figure 16:
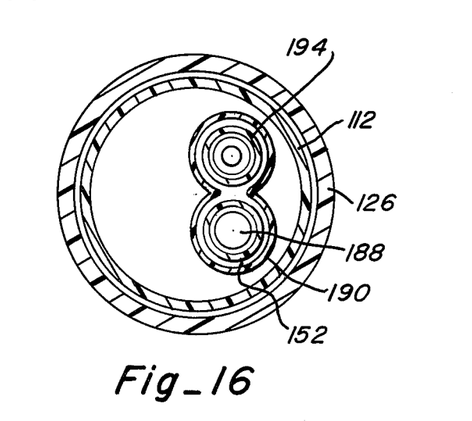
FIG. 16 is a cross-sectional view taken along the line 16—16 in FIG. 14.
Figure 17:
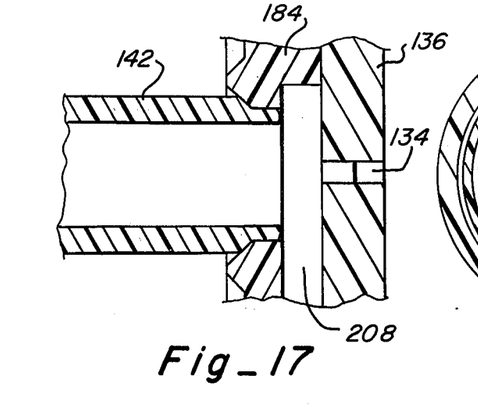
FIG. 17 is a fragmentary and enlarged cross-sectional view taken along the line 17—17 in FIG. 14.
Figure 18:
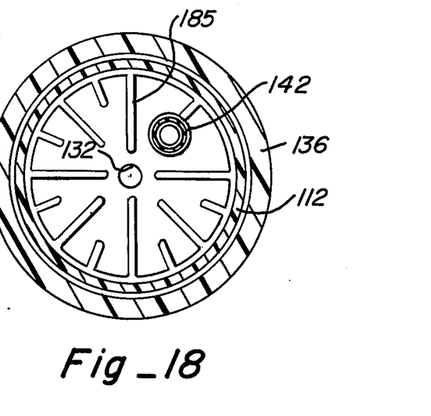
FIG. 18 is a cross-sectional view taken along the line 18—18 in FIG. 14.

In any event, the overall housing includes a first portion 126 which contains outlet arrangement 106 and valves 114 and 116 and a second portion 128 that depends downwardly from one end of portion 126 again as a handle dimensioned to be gripped by the human hand. Situated in association with portion 126 are valve operators 130 and 131 respectively for each of valves 116 and 114, the valve operators projecting from the end of portion 126 above the upper end of portion 128.

Included at the other end of housing portion 126 is a first opening 132 that is in communication with valve 114 and at least one additional opening 134 that is in communication with the other valve 116. As before, there preferably are a plurality of openings 134 spaced individually apart so as collectively to encircle opening 132.

It will be observed that cartridge chamber 110 is, in this version, located downstream from valves 114 and 116. Moreover, outlet openings 132 and 134 are formed in a cap 136 which closes one end of chamber 110. Cap 136 is threaded upon housing portion 126 so as both to secure the cap in place and seat cartridge 112 securely within chamber 110.

Chamber 110 and cartridge 112 together define a passage for the flow of water under control by valve 116 in by-pass of any action upon such flow of water by filter material 138 confined within cartridge 112. Again as before, the filter material preferably is a granulate activated carbon mixed with a silver zeolite sandwiched between fiberous sheets 140 and 140' of a material such as felt. The bypassing is achieved by the inclusion of a conduit 142 that runs entirely through cartridge 110.

Each of valves 114 and 116 includes a valve stem, respectively denominated by the numerals 144 and 146, that has one end, respectively 148 and 150, aligned to project within a corresponding hollow boss, respectively 152 and 154, that projects outwardly from the inlet end of cartridge 112. A pair of valve guides, respectively 156 and 158, are formed in housing portion 126, with each of valves 114 and 116, and particularly their valve stems, being received in a corresponding one of valve guides 156 and 158. Of course, valve operators 130 and 131 include a portion that is exposed to the exterior of the housing and each of which is affixed to one end of the corresponding one of the valve stems. Each of valve guides 156 and 158 includes a locator seat, respectively 160 and 162, that is receptive of a corresponding one of hollow bosses 152 and 154 that project outwardly from the one end of cartridge 112. Moreover, each of valve guides 156 and 158 receives an internal resilient seat, such as O-rings 164 and 168, for sealing cooperation with the corresponding valve stems. An external resilient seal 170, again on O-ring, seats each valve guide into the corresponding hollow boss. A snap ring 172 serves to provide retention against the spring force. A washer 174 is secured, as by sonic welding, to the inwardly projecting ends of the corresponding valve guides.

As particularly formed herein, valve operators 130 and 131 are complemented by an additional, but fixed, segment 176 that may well carry operating instructions or other indicia. Valve stems 144 and 146 are normally urged outwardly, to a water-path-closing condition, by compression springs 178 disposed between the respective ones of operative 130 and 131 and shoulders defined on respective valve guides 156 and 158. The end of housing portion 126 adjacent to valve operators 130 and 131 is formed to include an outwardly projecting peripheral lip that seats both the valve operators and segment 176. Housing portion 128 is in the form of a cylindrical tube that is threadably secured at its upper end to housing portion 126 and sealed thereto by means of an O-ring 180.

Figure 19:
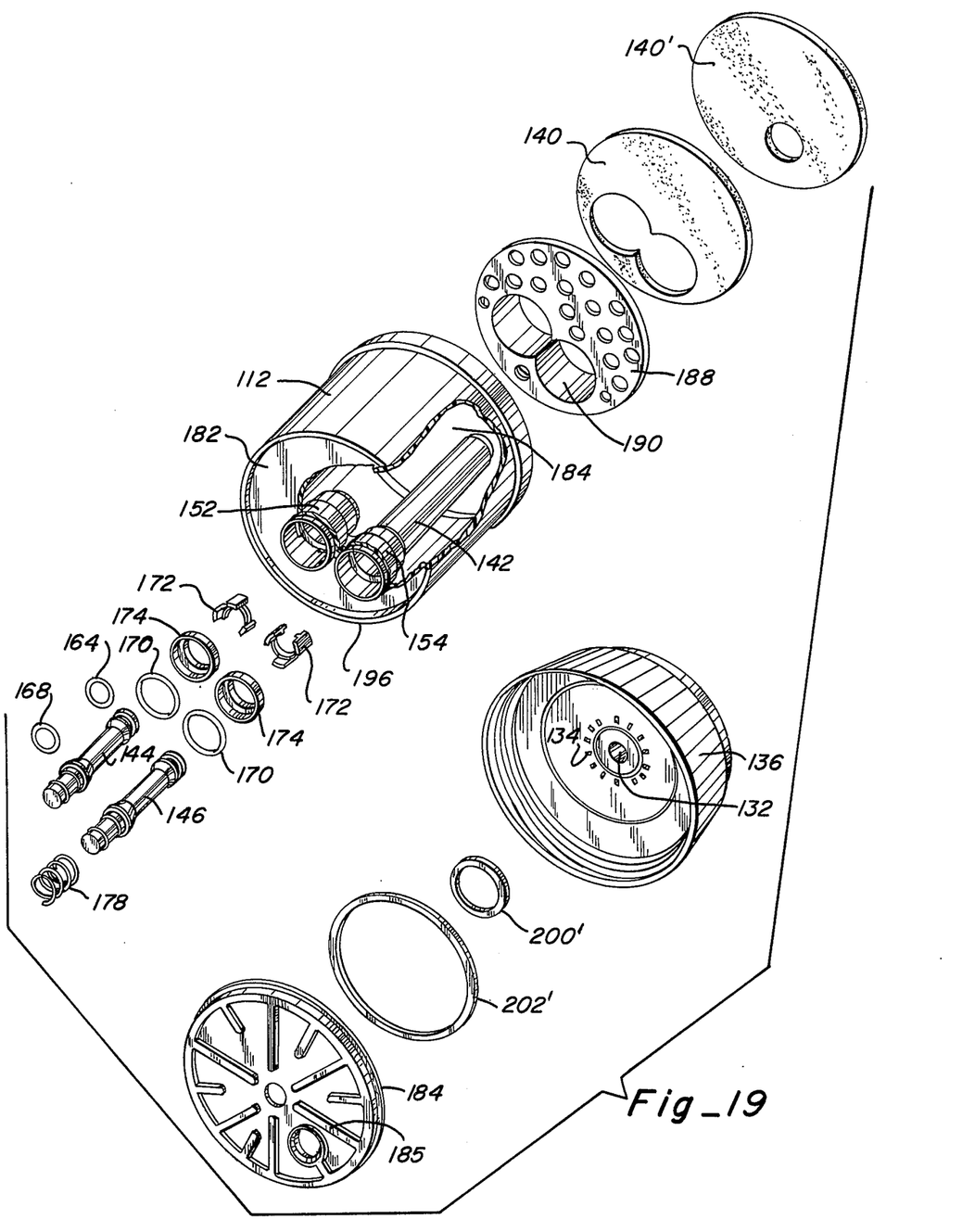
FIG. 19 is an exploded perspective view of a portion of the apparatus shown in FIGS. 8-18.
Figure 20:
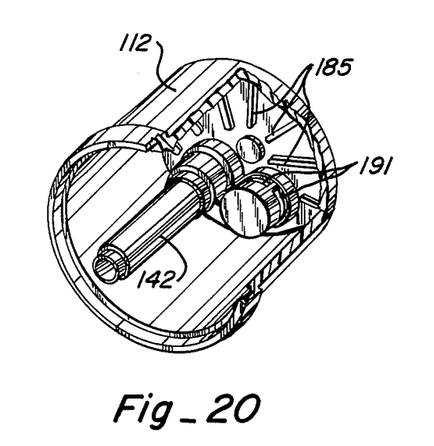
FIGS. 20-22 are reverse perspective views of portions of the apparatus shown in FIG. 19.
Figure 21:
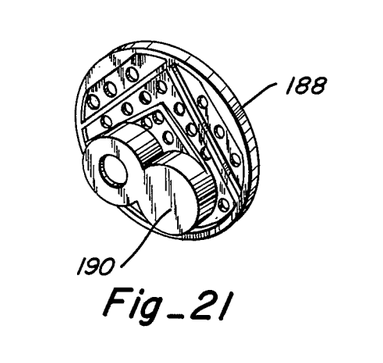
Figure 22:
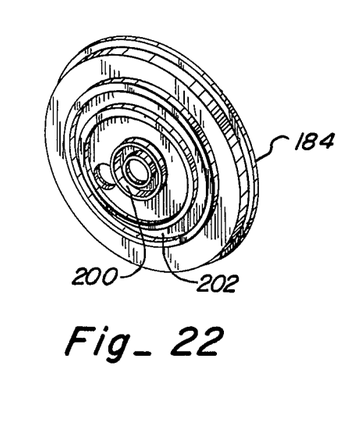

The detailed construction of cartridge 112 is significant in its simplication of that which is necessary in the fabrication of the remainder of the purifier assembly. Thus, cartridge 112 includes an inlet wall 182 and an outlet wall 184. A locating rib 186 projects outwardly from outlet wall 184, extending at least generally around the periphery of that outlet wall. As before, internal spacing ribs 185 project inwardly from each end wall to hold the active filter material in a spaced relationship in order to obtain a good flow profile. An apertured baffle plate 188 is spaced inwardly from inlet wall 182 and has a recess 190 to accommodate bosses 152 and 154. Baffle plate 188 and lateral openings 191 to boss 152 permit the flow of water deflected by the baffle plate generally in the plane of inlet wall 182. It will be observed that bosses 152 and 154 also constitute recesses receptive of one end of respective ones of valve stems 144 and 146 as well as the respective locator seats 160 and 162. Moreover, bosses 152 and 154 also serve to position baffle plate 188 in slightly spaced relationship to inlet wall 182.

A portion 194 of conduit 142 is enlarged at its juncture with inlet wall 182. The degree of enlargement is sufficient so as to be receptive of valve stem 146. Boss 154, being dimensioned to constitute a recess that is receptive of one end of valve stem 146, tends to complete an overall structure that insures proper valve operation while yet not requiring specific structure in the housing itself for that purpose. Cartridge 112 also includes a locating rib 196 that projects outwardly from inlet wall 182 in a manner to insure proper seating and valve alignment. Rib 196 generally extends around the periphery of inlet wall 182.

Within outlet wall 184, a recess 200 is formed into its exterior surface so as to encircle opening 132. A resilient sealing element 200' is seated in recess 200 to form a seal. Similarly, a second recess 202 is also formed into the exterior surface of outlet wall 184 so as to encircle spray openings 134. Again a sealing element 202' is seated in recess 202. Thus, recess 202 encircles recess 200. Further included in the exterior surface of outlet wall 184 is a third recess 208 that at least generally encircles recess 200 and is disposed between recesses 200 and 202. The outlet end of conduit 142 opens into recess 208 so as to permit distribution of the by-pass flow to and through spray outlets 134.

In each embodiment, the unit is in the form of a handheld water-discharge device that is capable of functioning exactly like the conventional vegetable spray attendant to so many kitchen sinks. Yet, by the simple operation of a pushbutton, it also serves to deliver purified water. The unit itself is so constructed as to be quite inexpensive. In addition, its active element for purification is in the form of a simple cartridge that also is inexpensive and readily replaceable. One end result is that of a very simple and comparatively inexpensive unit that fully performs in the manner of predecessor devices that require significantly more space and expense. By having the actual outlets for either purified or by-passed water at a common site, the unit is enabled to be quite compact.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. For use in a water purifier apparatus, a filter cartridge comprising:
   a tubular shell;
   an inlet wall substantially closing one end of said shell but having means defining first and third openings therein;
   an outlet wall substantially closing the other end of said shell but having means defining second and fourth openings therein;
   a conduit extending through the interior of said shell and between said third and fourth openings but exclusive of said first and second openings;
   a water-filtering material disposed within said shell in water-flow communication between said first and second openings but exclusive of said third and fourth openings and the interior of said conduit, said material substantially filling the entire space within said shell and surrounding said conduit;
   and said shell, said inlet wall, said outlet wall and said conduit being joined together to constitute a unitary cartridge assembly, with a portion of said conduit adjacent to said inlet wall being shaped to a conformation receptive of water-flow-control means cooperative therewith.

2. A filter cartridge as defined in claim 1 which further includes a baffle plate spaced inwardly from said inlet wall in alignment with said openings therein and means for supporting said baffle plate from said inlet wall while permitting flow of water through said first opening to be uniformly deflected by said baffle plate generally in the plane of said inlet wall, said supporting means together with said baffle plate being dimensioned to constitute a recess receptive of one end of a valve stem controlling the flow of water into said first opening in said inlet wall.

3. A filter cartridge as defined in claim 1 which further includes an outwardly opening hollow boss projecting inwardly from said inlet wall in encircling relationship to said first opening therein and being dimensioned to constitute a recess receptive of one end of an inwardly projecting valve stem controlling the flow of water through said first opening in said inlet wall.

4. A filter cartridge as defined in claim 1 in which a portion of said conduit adjacent to said inlet wall is enlarged, relative to the remainder of said conduit, to a dimension receptive of one end of a valve stem controlling the flow of water into said third opening in said inlet wall.

5. A filter cartridge as defined in claim 1 which further includes an outwardly opening hollow boss projecting inwardly from said inlet wall in encircling relationship to said third opening therein and being dimensioned to constitute a recess receptive of one end of an inwardly projecting valve stem controlling the flow of water through said third opening in said inlet wall.

6. A filter cartridge as defined in claim 1 which further includes a first recess formed into the exterior surface of said outlet wall and encircling said second opening therein for receiving a resilient sealing element seatable in said recess.

7. A filter cartridge as defined in claim 6 which further includes a second recess formed into the exterior surface of said outlet wall and encircling said fourth opening therein for receiving a second resilient sealing element seatable in said second recess.

8. A filter cartridge as defined in claim 7 in which said second opening is at least generally located centrally of said outlet wall and in which said second recess encircles said first recess.

9. A filter cartridge as defined in claim 8 which further includes a third recess formed into said outlet wall, at least generally encircling said first recess and disposed between said first and second recesses.

10. A filter cartridge as defined in claim 9 in which said fourth opening opens into said third recess.

11. An internally by-passable water purifier comprising:
a housing having an upstream portion and a downstream portion and defining through said portions a channel for the flow of water;
inlet means in said upstream portion of said housing for admitting a flow of water into said channel;
outlet means in said downstream portion of said housing for discharging a flow of water from said channel
a unitary filter-material-containing water-purifying cartridge having a tubular shell closed by inlet and outlet walls to contain said material, a first opening in said inlet wall and a second opening in said outlet wall;
means defining a chamber in said upstream portion of said housing for receiving said cartridge in said channel to establish a first path of flow through said first and second openings;
means running lengthwise of said chamber and of said inlet and outlet walls of said cartridge received therein and exteriorly outward of said tubular shell to establish a second path of flow in exclusive by-pass of said filter material contained within said cartridge;
means including a first valve disposed within said downstream portion of said housing in said channel for controlling the flow of water from said inlet means through said first and second openings of said cartridge to said outlet means;
and means including a second valve disposed within said downstream portion of said housing in said channel for controlling the flow of water from said inlet means to said outlet means by way of said second path of flow in exclusive by-pass of said filter material.

12. A water purifier as defined in claim 11 in which said outlet means includes a first opening in said downstream portion of said housing in communication with said first valve and at least one second opening in said downstream portion of said housing in communication with said second valve.

13. A water purifier as defined in claim 11 in which said upstream portion is threaded into said downstream portion to secure the two portions together and seat said cartridge securely within said chamber.

14. A water purifier as defined in claim 11 in which said housing includes said downstream portion containing said outlet means and said valves and said upstream portion downwardly depends from one end of said downstream portion as a handle dimensioned to be gripped by the human hand.

15. A water purifier as defined in claim 14 in which said inlet means includes a threaded coupling formed in the lower end of said upstream portion with sealing arrangements conforming to those standard for connection to a vegetable-spray hose associated with a kitchen sink.

16. An internally by-passable water purifier comprising:
a housing;
inlet means in said housing for admitting a flow of water;
outlet means in said housing for discharging a flow of water from a common portion of said housing;
channel means in said housing defining a path for the flow of water from said inlet means to said outlet means;
a filter-material-containing water-purifying cartridge;
a chamber defined in said channel means for receiving said cartridge in the path of said flow;
means including a first valve disposed in said channel means for controlling the flow of water from said inlet means through said cartridge to said outlet means;
means including a second valve disposed in said channel means for controlling the flow of water from said inlet means to said outlet means in exclusive by-pass of said filter material;
said housing including a first portion containing said outlet means and said valves and a second portion downwardly depending from one end of said first portion as a handle dimensioned to be gripped by the human hand;
said outlet means being formed in the other end of said first portion;
and a valve operator for each of said first and second valves and projecting from said one end of said first portion above the upper end of said second portion.

17. An internally by-passable water purifier comprising:

a housing having an upstream portion and a downstream portion and defining through said portions a channel for the flow of water;

inlet means in said upstream portion of said housing for admitting the flow of water into said channel;

outlet means in said downstream portion of said housing for discharging a flow of water from said channel;

a unitary filter-material-containing water-purifying cartridge having a tubular shell closed by inlet and outlet walls to contain said material, first and third openings in said inlet wall and second and fourth openings in said outlet wall, a conduit extending through the interior of said shell and between said third and fourth openings but exclusive of said first and second openings with said material disposed within said shell in water-flow communication between said first and second openings but exclusive of said third and fourth openings and the interior of said conduit;

means defining a chamber in said downstream portion of said housing for receiving said cartridge in said channel to establish a first path of flow through said first and second openings and to establish a second path of flow in exclusive by-pass of said filter material contained within said cartridge and through said third opening, said conduit and said fourth opening;

means including a first valve disposed in said channel for controlling the flow of water from said inlet means through said first and second openings of said cartridge to said outlet means;

and means including a second valve disposed in said channel for controlling the flow of water from said inlet means by way of said second path of flow.

18. A water purifier as defined in claim 17 in which said outlet means is formed in a cap closing one end of said chamber.

19. A water purifier as defined in claim 18 in which said cap is threaded upon said housing to secure the cap in place and seat said cartridge securely within said chamber.

20. A water purifier as defined in claim 17 in which said material substantially fills the entire space within said shell and surrounds said conduit.

21. A water purifier as defined in claim 17 in which each of said first valve and said second valve are located in a position upstream of said cartridge.

22. An internally by-passable water purifier comprising:

a housing;

inlet means in said housing for admitting a flow of water;

outlet means in said housing for discharging a flow of water from a common portion of said housing;

channel means in said housing defining a path for the flow of water from said inlet means to said outlet means;

a filter-material-containing water-purifying cartridge;

a chamber defined in said channel means for receiving said cartridge in the path of said flow;

means including a first valve disposed in said channel means for controlling the flow of water from said inlet means through said cartridge to said outlet means;

means including a second valve disposed in said channel means for controlling the flow of water from said inlet means to said outlet means in exclusive by-pass of said filter material;

and each of said valves including a valve stem having one end aligned to project within a corresponding hollow boss projecting outwardly from one end of said cartridge.

23. An internally by-passable water purifier comprising:

a housing;

inlet means in said housing for admitting a flow of water;

outlet means in said housing for discharging a flow of water from a common portion of said housing;

channel means in said housing defining a path for the flow of water from said inlet means to said outlet means;

a filter-material-containing water-purifying cartridge;

a chamber defined in said channel means for receiving said cartridge in the path of said flow;

means including a first valve disposed in said channel means for controlling the flow of water from said inlet means through said cartridge to said outlet means;

means including a second valve disposed in said channel means for controlling the flow of water from said inlet means to said outlet means in exclusive by-pass of said filter material;

a pair of valve guides formed in said housing;

each of said valves including a valve stem received in a corresponding one of said valve guides;

and a valve operator having a portion exposed to the exterior of said housing that is affixed to one end of each corresponding one of said valve stems.

24. A water purifier as defined in claim 23 in which each of said valve guides includes a locator seat receptive of a corresponding hollow boss projecting outwardly from one end of said cartridge.

25. A water purifier as defined in claim 24 in which each of said valve guides includes an external resilient seal for cooperation with the corresponding boss and an internal resilient seat for cooperation with the corresponding valve stem.

26. An internally by-passable water purifier comprising:

a housing having an upstream portion and a downstream portion and defining through said portions a channel for the flow of water;

inlet means in said upstream portion of said housing for admitting the flow of water into said channel;

outlet means in said downstream portion of said housing for discharging a flow of water from said channel;

a unitary filter-material-containing water-purifying cartridge having a tubular shell closed by inlet and outlet walls to contain said material, first and third openings in said inlet wall and second and fourth openings in said outlet wall, a conduit extending through the interior of said shell and between said third and fourth openings but exclusive of said first and second openings with said material disposed within said shell in water-flow communication between said first and second openings but exclusive of said third and fourth openings and the interior of said conduit;

means defining a chamber in said downstream portion of said housing for receiving said cartridge in said channel to establish a first path of flow through said first and second openings and to establish a second path of flow in exclusive by-pass of said filter material contained within said cartridge and through said third opening, said conduit and said fourth opening;

means including a first valve disposed in said channel for controlling the flow of water from said inlet means through said first and second openings of said cartridge to said outlet means;

means including a second valve disposed in said channel for controlling the flow of water from said inlet means by way of said second path of flow;

and said housing including said downstream portion containing said outlet means and said valves with said upstream portion downwardly depending from one end of said downstream portion as a handle dimensioned to be gripped by the human hand.

27. A water purifier as defined in claim 26 in which said inlet means includes a threaded coupling formed in the lower end of said upstream portion with sealing arrangements conforming to those standard for connection to a vegetable-spray hose associated with a kitchen sink.

28. A water purifier as defined in claim 26 in which said outlet means is formed in the outermost end of said downstream portion and which further includes a valve operator for each of said first and second valves and projecting from said one end of said downstream portion above the upper end of said upstream portion.

29. An internally by-passable water purifier comprising:

a housing having an upstream portion and a downstream portion and defining through said portions a channel for the flow of water;

inlet means in said upstream portion of said housing for admitting the flow of water into said channel;

outlet means in said downstream portion of said housing for discharging a flow of water from said channel;

a unitary filter-material-containing water-purifying cartridge having a tubular shell closed by inlet and outlet walls to contain said material, first and third openings in said inlet wall and second and fourth openings in said outlet wall, a conduit extending through the interior of said shell and between said third and fourth openings but exclusive of said first and second openings with said material disposed within said shell in water-flow communication between said first and second openings but exclusive of said third and fourth openings and the interior of said conduit;

means defining a chamber in said downstream portion of said housing for receiving said cartridge in said channel to establish a first path of flow through said first and second openings and to establish a second path of flow in exclusive by-pass of said filter material contained within said cartridge and through said third opening, said conduit and said fourth opening;

means including a first valve disposed in said channel for controlling the flow of water from said inlet means through said first and second openings of said cartridge to said outlet means;

means including a second valve disposed in said channel for controlling the flow of water from said inlet means by way of said second path of flow;

and said outlet means including a first opening in said downstream portion of said housing in communication with said first valve and at least one second opening in said downstream portion of said housing in communication with said second valve.

30. An internally by-passable water purifier comprising:

a housing having an upstream portion and a downstream portion and defining through said portions a channel for the flow of water;

inlet means in said upstream portion of said housing for admitting a flow of water into said channel;

outlet means in said downstream portion of said housing for discharging a flow of water from said channel;

a unitary filter-material-containing water-purifying cartridge having a tubular shell closed by inlet and outlet walls to contain said material, a first opening in said inlet wall and a second opening in said outlet wall;

means defining a chamber in said upstream portion of said housing for receiving said cartridge in said channel to establish a first path of flow through said first and second openings;

a plurality of ribs circumferentially-spaced around said shell and projecting between said shell and the wall of said chamber, said ribs individually running between said inlet and outlet walls to establish a second path of flow in exclusive by-pass of said filter material contained within said cartridge;

means including a first valve disposed in said channel for controlling the flow of water from said inlet means through said first and second openings of said cartridge to said outlet means;

and means including a second valve disposed in said channel for controlling the flow of water from said inlet means to said outlet means by way of said second path of flow in exclusive by-pass of said filter material.

31. A water purifier as defined in claim 30 in which said chamber is located upstream of said first and second valves.

32. A water purifier as defined in claim 30 in which said upstream portion is threaded into said downstream portion to secure the two portions together and seat said cartridge securely within said chamber.

33. A water purifier as defined in claim 30 in which said housing includes said downstream portion containing said outlet means and said valves and said upstream portion downwardly depends from one end of said downstream portion as a handle dimensioned to be gripped by the human hand.

34. A water purifier as defined in claim 33 in which said inlet means includes a threaded coupling formed in the lower end of said upstream portion with sealing arrangements conforming to those standard for connection to a vegetable-spray hose associated with a kitchen sink.

35. A water purifier as defined in claim 33 in which said outlet means is formed in the outermost end of said downstream portion and which further includes a valve operator for each of said first and second valves and projecting from said one end of said downstream portion above the upper end of said upstream portion.

36. A water purifier as defined in claim 30 in which said outlet means includes a first opening in said downstream portion of said housing in communication with said first valve and at least one second opening in said downstream portion of said housing in communication with said second valve.

37. For use in a water purifier apparatus, a filter cartridge comprising:
- a tubular shell;
- an inlet wall substantially closing one end of said shell but having first means defining water flow passage through said inlet wall;
- an outlet wall substantially closing the other end of said shell but having second means defining water flow passage through said outlet wall;
- a water-filtering material disposed within said shell in water-flow communication between said first and second passage defining means, said material substantially filling the entire spaced within said shell and said shell, said inlet wall and said outlet wall being joined together to constitute a unitary cartridge assembly;
- an outwardly opening first hollow boss included in said first passage means and projecting inwardly from said inlet wall, said first hollow boss being shaped to a conformation receptive of water-flow-control means cooperative therewith;
- and an outwardly opening second hollow boss projecting inwardly from said inlet wall, said second hollow boss being spaced laterally on said inlet wall from said first hollow boss.

* * * * *

UNITED STATES PATENT OFFICE
CERTIFICATE OF CORRECTION

Patent No. 4,107,046          Dated August 15, 1978

Inventor(s) Thomas E. Corder

It is certified that error appears in the above-identified patent and that said Letters Patent are hereby corrected as shown below:

In the heading, item [63] should read:

-- Continuation of Ser. No. 617,449, September 29, 1975, abandoned. --

Also, line 4 of column 1 of the specification should read:

Sept. 29, 1975 instead of Sept. 10, 1975

Signed and Sealed this

Nineteenth Day of June 1979

[SEAL]

Attest:

RUTH C. MASON
Attesting Officer

DONALD W. BANNER
Commissioner of Patents and Trademarks